(12) United States Patent
Hensley

(10) Patent No.: US 6,851,696 B1
(45) Date of Patent: Feb. 8, 2005

(54) TRAILER HITCH WITH SEPARATED FUNCTIONS

(75) Inventor: James C. Hensley, Centralia, IL (US)

(73) Assignee: James C. Hensley Revocable Living Trust A, Centralia, IL (US)

( * ) Notice: Subject to any disclaimer, the term of this patent is extended or adjusted under 35 U.S.C. 154(b) by 0 days.

(21) Appl. No.: 10/779,398

(22) Filed: Feb. 13, 2004

Related U.S. Application Data

(60) Provisional application No. 60/447,369, filed on Feb. 14, 2003.

(51) Int. Cl.$^7$ ................................................. B60D 3/00
(52) U.S. Cl. ..................... 280/455.1; 280/407; 280/432
(58) Field of Search ............................. 280/455.1, 432, 280/446.1, 457, 462, 405.1, 406.1, 407

(56) References Cited

U.S. PATENT DOCUMENTS

| | | | |
|---|---|---|---|
| 2,133,065 | A | 10/1938 | Weber |
| 2,704,218 | A | 3/1955 | Claud-Mantle |
| 2,871,029 | A * | 1/1959 | Demarest .................... 280/477 |
| 2,940,776 | A | 6/1960 | Curtis |
| 3,057,644 | A | 10/1962 | Fisher |
| 3,279,819 | A | 10/1966 | Edmonds |
| 3,393,923 | A * | 7/1968 | Rendessy .................... 280/432 |
| 3,520,556 | A | 7/1970 | Warner |
| 3,602,529 | A | 8/1971 | Derr, Jr. |
| 3,690,699 | A | 9/1972 | Derr, Jr. |
| 3,724,913 | A | 4/1973 | Levy |
| 3,751,069 | A | 8/1973 | Suckow |
| 3,778,088 | A | 12/1973 | Alexander |
| 3,787,068 | A | 1/1974 | Miller |
| 3,861,717 | A | 1/1975 | Knox |
| 3,871,686 | A | 3/1975 | Rendessy |
| 3,891,237 | A | 6/1975 | Allen |
| 3,891,238 | A | 6/1975 | Ehlert |
| 3,909,075 | A | 9/1975 | Pittet, Jr. et al. |
| 3,948,544 | A | 4/1976 | Presley et al. |
| 3,964,767 | A | 6/1976 | Williams |
| 3,967,863 | A | 7/1976 | Tomecek et al. |
| 3,981,517 | A * | 9/1976 | Crochet, Sr. ............. 280/478.1 |
| 4,077,234 | A | 3/1978 | Crochet, Sr. |
| 4,178,011 | A | 12/1979 | Kirsch |
| 4,196,918 | A | 4/1980 | Strader |
| 4,198,073 | A | 4/1980 | Olsen |
| 4,213,627 | A | 7/1980 | Thompson |
| 4,281,847 | A | 8/1981 | Robe |
| 4,312,516 | A | 1/1982 | Olsen |
| 4,398,252 | A | 8/1983 | Frait |
| 4,511,159 | A | 4/1985 | Younger |
| 4,515,387 | A | 5/1985 | Schuck |
| 4,560,184 | A | 12/1985 | Williams, Jr. |
| 4,572,030 | A | 2/1986 | Sakurai et al. |
| 4,582,337 | A | 4/1986 | Hseuh |
| 4,606,549 | A | 8/1986 | Williams, Jr. |
| 4,613,149 | A | 9/1986 | Williams, Jr. |
| 4,721,344 | A | 1/1988 | Frait et al. |
| 4,726,627 | A | 2/1988 | Frait et al. |
| 4,802,562 | A | 2/1989 | Kuroyanagi et al. |
| 4,804,237 | A | 2/1989 | Gee et al. |
| 4,811,967 | A | 3/1989 | Hensley |

(List continued on next page.)

FOREIGN PATENT DOCUMENTS

| | | | | |
|---|---|---|---|---|
| DE | 2057388 | | 11/1970 | |
| DE | 3301460 | * | 7/1984 | ............. B60D/1/00 |
| FR | 2696130 | * | 4/1994 | ............. B60D/3/00 |
| WO | 94/08804 | * | 4/1994 | ............. B60D/1/30 |

*Primary Examiner*—Avraham Lerner
(74) *Attorney, Agent, or Firm*—Polster, Lieder, Woodruff & Lucchesi

(57) ABSTRACT

A hitch assembly for coupling a trailer to a tow vehicle includes a number of assemblies, including converging links and a slide assembly, that effectively places the pivot point for the trailer ahead of the actual hitch assembly, which in turn enhances the stability of the combination tow vehicle and trailer, rendering it less susceptible to swaying or fishtailing. This is done without placing tongue weight on converging links or the slide assembly so that the hitch assembly can accommodate a larger gross trailer load.

15 Claims, 10 Drawing Sheets

U.S. PATENT DOCUMENTS

| | | |
|---|---|---|
| 4,888,997 A | 12/1989 | Eckert et al. |
| 4,978,177 A | 12/1990 | Ingraham et al. |
| 5,010,972 A | 4/1991 | Ingraham et al. |
| 5,217,280 A | 6/1993 | Nykerk et al. |
| 5,222,754 A | 6/1993 | Few |
| 5,251,966 A | 10/1993 | Friederichs et al. |
| 5,273,347 A | 12/1993 | Hansson |
| 5,306,037 A * | 4/1994 | Robertson .................. 280/495 |
| 5,427,440 A | 6/1995 | Ward et al. |
| 5,438,516 A | 8/1995 | Neubauer et al. |
| 5,443,306 A | 8/1995 | Broome |
| 5,615,930 A | 4/1997 | McGrath et al. |
| 5,620,236 A | 4/1997 | McGrath et al. |
| 6,485,046 B1 * | 11/2002 | Hsueh et al. ............. 280/455.1 |
| 2001/0033068 A1 * | 10/2001 | Melesko et al. .......... 280/455.1 |
| 2002/0190498 A1 * | 12/2002 | Schmidt et al. .......... 280/455.1 |

* cited by examiner

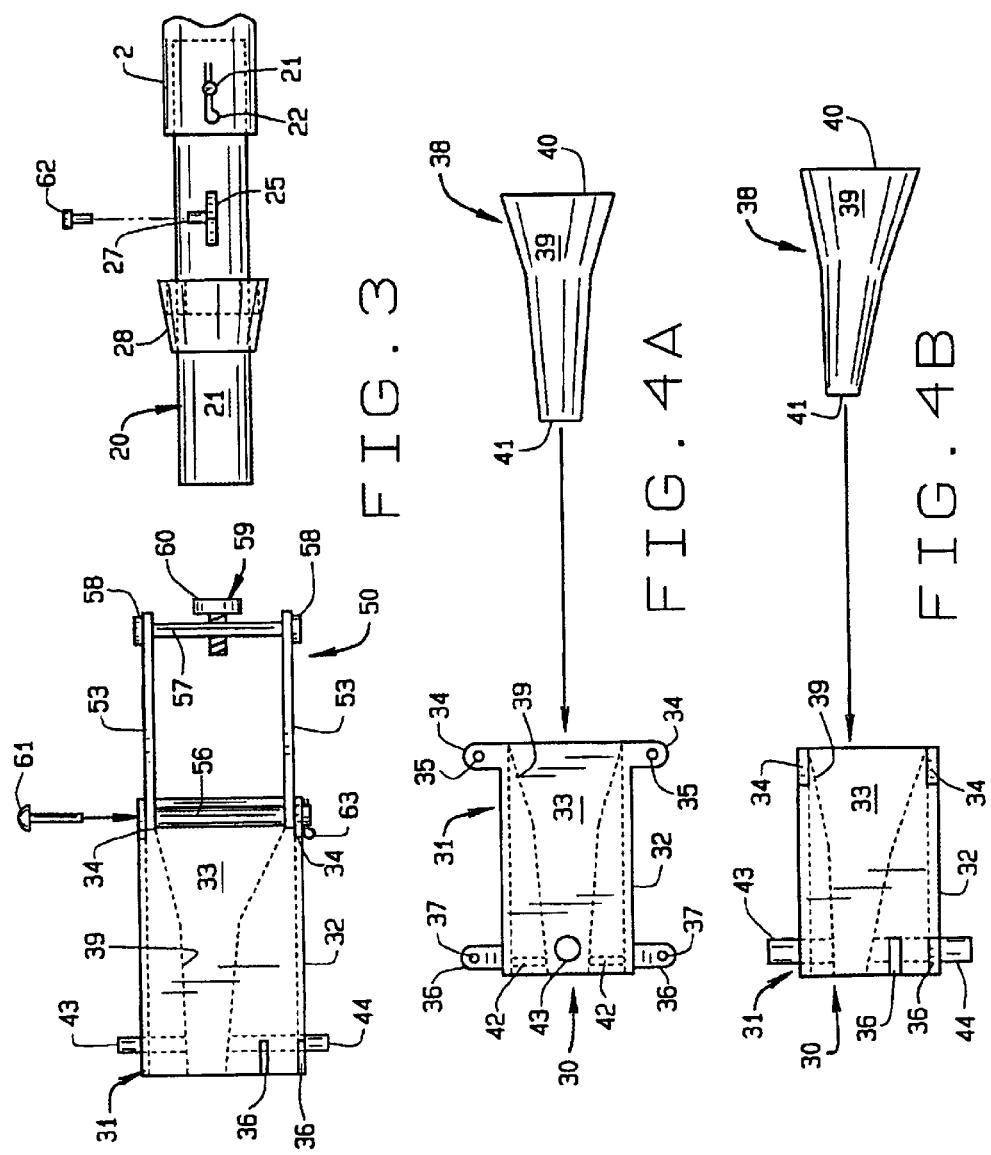

TRAILER HITCH WITH SEPARATED FUNCTIONS

CROSS-REFERENCE TO RELATED APPLICATIONS

This application is related to U.S. Provisional Patent Application No. 60/447,369 filed Feb. 14, 2003, from which priority is claimed.

STATEMENT REGARDING FEDERALLY SPONSORED RESEARCH

Not Applicable.

BACKGROUND OF THE INVENTION

The first trailer hitches only consisted of a clevis and a pin, and later a ball mounted on the framework of a tow vehicle or a ball mount inserted into a receiver type hitch. These types of trailer hitches allowed for movement in all directions between the tow vehicle and the trailer. However, all that movement can negatively affect steering, braking, control, and overall vehicle performance. In addition, the increase in gross trailer weights over the years created the need for trailers that can handle different size weights, both large and small.

To accommodate different gross trailer weights, trailer hitches for light vehicles and trailers, such as autos, vans, SUV's, and pickup trucks, are generally one of four ratings, divided into Classes I–IV. For the purposes of this patent application, gross trailer weight is defined as the weight of the trailer when it is fully loaded. Ordinarily, hitches are rated for 10% of gross trailer weight to be on the tongue, referred to as the tongue weight. For the purposes of this patent application, tongue weight is defined as the weight put on a hitch ball by a trailer coupler.

A Class I hitch comprises a framework attached to a tow vehicle including a ball mount and ball for attaching a trailer coupler. This Class is generally rated at 2,000 lb. gross trailer weight. In addition, the ball mount can be either fixed or removable.

A Class II hitch is similar to Class I, except that the rating is generally 3,500 lb. Like Class I, Class II can have either a fixed or removable ball mount.

A Class III hitch only uses a removable ball mount. This style of hitch is known as a "hitch receiver". In addition to ball mounts, a hitch receiver can be used with other more complicated types of mounts.

A Class IV hitch is similar to Class III, except it is heavier duty. This Class may be rated as high as 14,000 lbs. gross trailer weight.

To handle heavy trailer loads, a weight distribution hitch was invented. As trailer loads increase, tongue weight also increases. When tongue weight increases too much, it pushes down the rear of the tow vehicle causing numerous problems. To counteract this problem, the weight distribution hitch uses spring bars attached to a ball mount and a trailer frame to distribute the tongue weight among all the tow vehicle wheels and all the trailer wheels. As a result, the tow vehicle remains nearer to level from front to back while the trailer is attached. While this type of hitch is a big improvement over previous systems, it does very little to solve the problem of side-to-side movement of the trailer or sway, commonly called fishtail sway.

Fishtail sway is caused by the large distance between the rear axle of the tow vehicle and the hitch assembly and is aggravated by lateral forces against the vehicle caused by winds or passing vehicles. Previous attempts to solve fishtail sway involve stiffening the connection between tow vehicle and trailer by using various methods of friction. While these methods help some, none completely correct the problem.

Fortunately, in U.S. Pat. No. 4,722,542, hereafter referred to as the "Hensley hitch", the sway problem is effectively corrected by forcing the hitch to turn through converging links that effectively move the pivot point between the tow vehicle and trailer to a point near the rear axle of the tow vehicle. Therefore, this design provides better steering and control of the trailer by eliminating trailer sway. While the converging links do this very well, the gross trailer weight is limited by the size and design of the converging links in '542 because so much of the tongue weight is supported by the converging links. As a result, increasingly heavier tongue weights require larger links, larger bearings, larger spindles, and larger related support systems. Increasing the size of these parts also increases both the hitch weight and the cost of manufacturing. In addition, the Hensley hitch needs workable brakes on the trailer controlled from the tow vehicle. Without trailer brakes or even with surge brakes the converging links tend to move to one side or the other due to the trailer pushing on the hitch assembly when the tow vehicle brakes are applied.

U.S. Pat. No. 5,660,409, hereafter referred to as the "Hensley mini-hitch", does not need workable brakes on the trailer controlled from the tow vehicle. However, the Hensley mini-hitch is still limited to use on lighter trailers with relatively light tongue weight, because the tongue weight is supported by the on a sliding ball mount. In this design, a strut holds the trailer at a constant distance from the tow vehicle while stopping. In addition, a ball mounted on a sliding mount holds the trailer at a constant distance from the tow vehicle during turns. Still, this design requires maintaining this sliding mechanism as near a zero clearance as possible. To maintain this narrow clearance, fine-tuning and maintenance is required on the sliding mount. Nonetheless, this design is not practical for use with extremely heavy tongue weight.

Therefore, it would be advantageous to have a trailer hitch with a converging links design which does not support tongue weight with the converging links. A trailer hitch of this type could accommodate light and heavy trailer loads without the extra weight and cost associated with larger parts.

SUMMARY OF THE INVENTION

Briefly stated, the invention is a hitch assembly comprising a hitch bar assembly coupled with a hitch receiver of a tow vehicle for transferring pulling and stopping forces to and from the tow vehicle. A hitch box assembly couples with the hitch bar assembly for transferring pulling and stopping forces to and from the hitch bar assembly, the hitch box assembly having a first pivot point. An overcenter latch assembly secures the hitch box assembly to the hitch bar assembly. A front support member pivotally connects to the hitch box assembly at the first pivot point for transferring pulling and stopping forces to and from the hitch box assembly and for pivoting during turns. A strut assembly pivotally connects to the front support member for transferring pulling and stopping forces to and from the front support member wherein the strut assembly can pivot vertically for accommodating uneven roads during driving. Also, the strut assembly includes a second pivot point. A ball mount assembly pivotally connects to the strut assembly at the second pivot point for transferring pulling and stopping forces to and from the strut assembly. The ball mount assembly laterally pivots about the second pivot point within the strut assembly during turns. The ball mount assembly includes a tail tube extending rearwardly. A ball plate assembly attaches to the ball mount assembly for transferring pulling and stopping forces to and from the ball mount assembly. The ball plate assembly includes a hitch ball for removable attachment of the trailer for transferring pulling and stopping forces to and from the trailer. A tail support assembly attaches to a trailer frame and couples with the tail tube whereby the tail support assembly restricts lateral movement of the tail tube and the ball mount assembly so the trailer remains relative to the ball mount assembly at all times. A slide assembly resides within the ball mount assembly such that forces inherent in towing the trailer are not transferred through the slide assembly. The slide assembly slides forwards and backwards to accommodate the change in radial movement of the converging links during turns. Converging links pivotally connect between the hitch box assembly at the first pivot point and the slide assembly whereby the angular position between the first pivot point and slide assembly can be varied. The converging links effectively move the pivot point between the tow vehicle and trailer forward of the hitch assembly. In addition, forces inherent in towing the trailer are not transferred through the converging links. A hanging support assembly attaches to the strut assembly including vertical links pivotally attached to the ball mount assembly for transferring tongue weight from the ball mount assembly through the strut assembly and front support member to the hitch box assembly and hitch bar assembly so tongue weight is not exerted on the converging links or the slide assembly. A jack assembly attaches between the trailer frame and the front support member for distributing tongue weight among tow vehicle wheels and trailer wheels.

The foregoing and other features, and advantages of the invention as well as embodiments thereof will become more apparent from the reading of the following description in connection with the accompanying drawings.

DESCRIPTION OF THE DRAWINGS

In the accompanying drawings which form part of the specification:

FIG. 3 is a side view of the hitch bar and the hitch box assembly.

FIG. 4A is a top view of the hitch box assembly.

FIG. 4B is a side view of the hitch box assembly.

FIG. 58 is a partial top view of the hitch assembly of the present invention.

Corresponding reference numerals indicate corresponding parts throughout the several figures of the drawings.

DETAILED DESCRIPTION

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
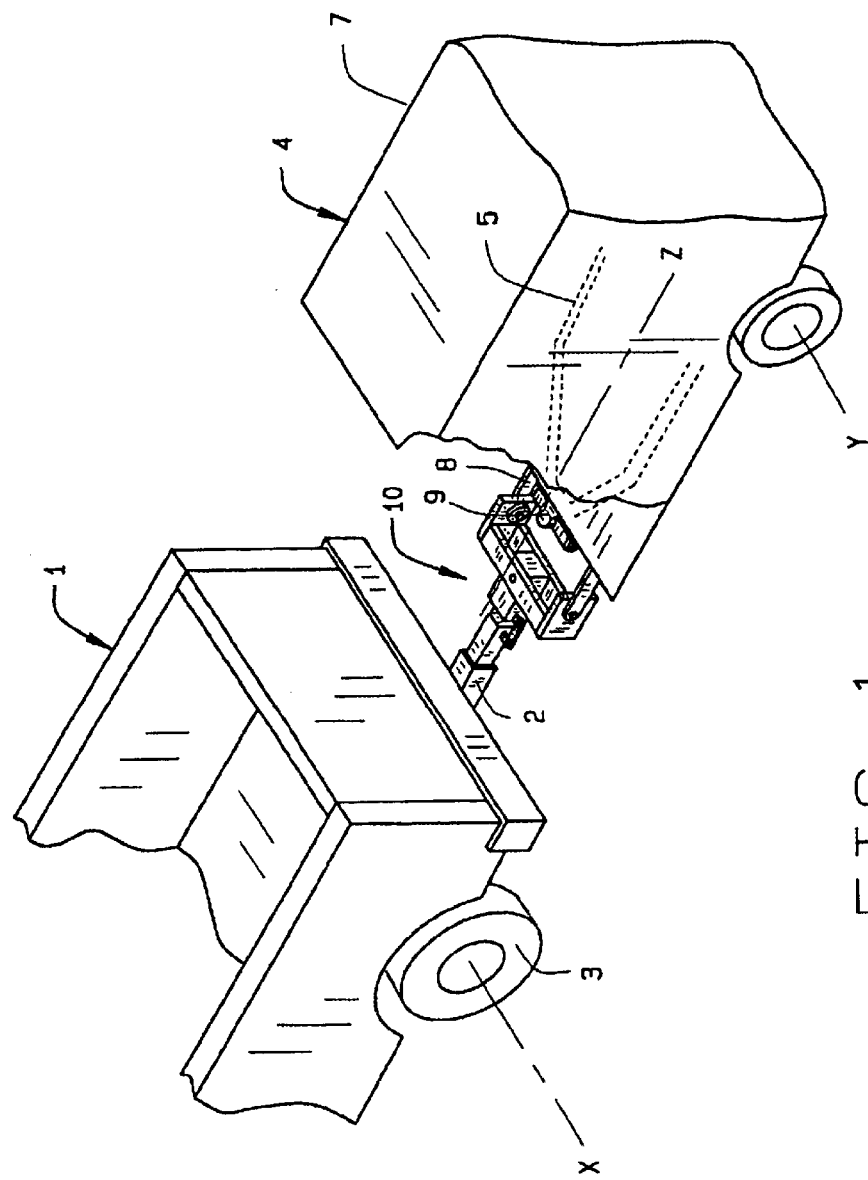
FIG. 1 is a perspective view of a trailer connected to a tow vehicle with a hitch assembly constructed in accordance with and embodying the present invention.

Referring now to the drawings, particularly FIG. 1, a tow vehicle 1 is coupled to a trailer 4 with a hitch assembly 10 of the present invention. It will be appreciated by those skilled in the art that the tow vehicle 1 can be any conventional automobile, a van, or truck such as the pickup shown in FIG. 1. Further, as used in the specification and the claims, the term trailer is intended to include any type of towable device or vehicle that can be pulled behind or trails a tow vehicle. The tow vehicle 1 includes rear wheels 3 which revolve about an axis X. The tow vehicle 1 includes a conventional hitch receiver 2, which is appropriately secured to the tow vehicle 1 in any conventional or accepted manner.

The trailer 4 has a frame 5 which is supported on wheels 6 that revolve about a common axis Y, and the frame 5 in turn supports a trailer body 7. The front of the frame 5 forms a so-called tongue or A-frame, in that it has side members 8 which converge forwardly and are connected at their forward ends to a coupler 9 used to secure the trailer 4 to a hitch ball 108 of the hitch assembly 10. The coupler 9 is a generally spherical socket that opens downwardly and is sized to receive a conventional trailer hitch ball. The coupler 9 also has a conventional locking device which will close upon the hitch ball and retain it in the socket. The coupler 9 may also contain a conventional surge brake. Generally, a surge brake contains a master cylinder that is hydraulically connected through lines to brakes at the wheels of the trailer 4. A conventional surge brake is actuated when the tow vehicle slows or stops and the forward movement of the trailer 4 urges the master cylinder against the hitch ball, which in turn, causes hydraulic actuation of the brakes at the trailer wheels. The hitch assembly 10 of the present invention can accommodate trailers employing conventional surge brakes as well as trailers employing more exotic braking mechanisms. A typical trailer also includes safety chains and an electric plug.

The present invention has three separate functions: 1) pulling and stopping, 2) sway controlling, and 3) load bearing. In order to better illustrate the three separate functions of the invention, the remaining description is divided into three separate sections with each section concentrating on one of the three functions of the invention.

Pulling and Stopping

As shown in FIGS. 1–6, for pulling and stopping the trailer 4 the hitch assembly 10 comprises a hitch bar assembly 20, a hitch box assembly 30, an over-center latch assembly 50, a front support member 70, a strut assembly 90, and a ball mount assembly 100. Together, these assemblies connect the tow vehicle 1 to the trailer 4 for transferring the pulling and stopping forces of the tow vehicle 1 to the trailer 4. More importantly, none of the pulling and stopping forces are transferred through converging links 140, which will be described below in greater detail.

Figure 2:
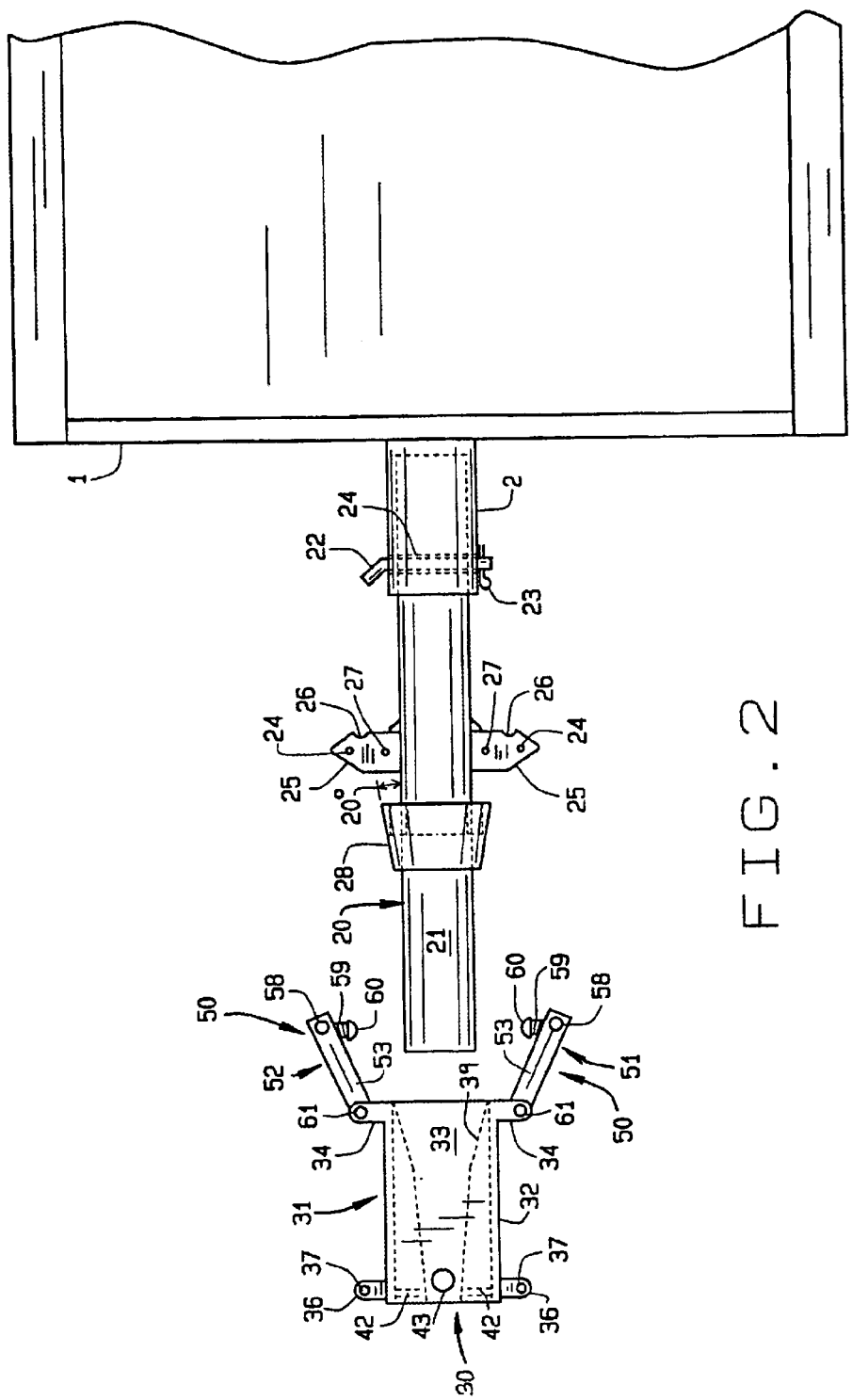
FIG. 2 is a top view of a hitch bar and a hitch box assembly.
Figure 5A:
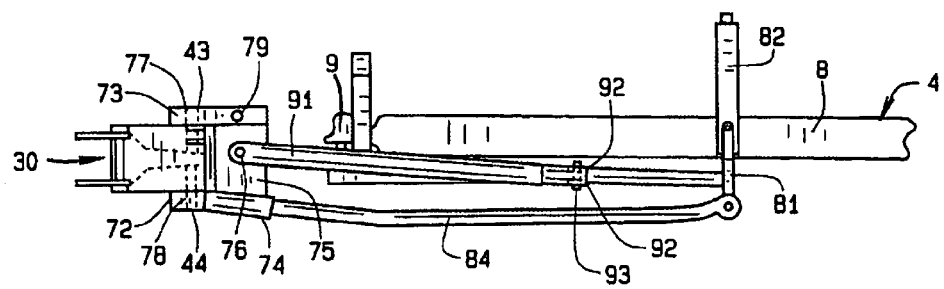
FIG. 5A is a partial side view of the hitch assembly of the present invention.
Figure 5B:
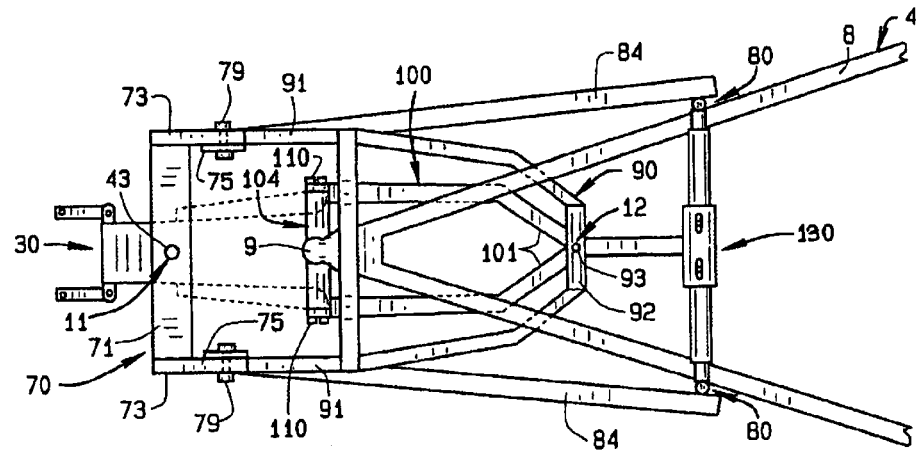

As shown in FIGS. 2 and 3, the hitch bar assembly 20 is a square bar 21 that inserts into the hitch receiver 2 and projects rearwardly in a generally horizontal orientation with its longitudinal axis along the centerline of the tow vehicle 1. The hitch bar assembly 20 fits snugly into the hitch receiver 2 with very little clearance and is secured by inserting a standard hitch pin 22 and clip 23 into corresponding through holes 24. The hitch bar assembly 20 includes over-center latch tabs 25 welded to each side of the bar 21 at the mid-section. The tabs 25 project laterally from the bar 21 and define through holes 24, concave recesses 26, and roll pins 27 for coupling with the over-center latch assembly 50 to be described below. The hitch bar assembly 20 also includes stops 28 welded to the rear of the tabs 25 on all four sides of the bar 21 for mating with the hitch box assembly 30 to be described below. The stops 28 are wedges with beveled faces facing rearwardly with an angle of about 20°.

The hitch box assembly 30 is similar to the one disclosed in U.S. Pat. No. 4,811,967, hereby incorporated by reference, which mates with the hitch bar assembly 20. As shown in FIGS. 4A and 4B, the hitch box assembly 30 comprises an outer hitch box 31 and an inner hitch box 38. The outer hitch box 31 comprises four sidewalls 32 which are joined together to form a square box-like enclosure defining an opening 33 for receiving the inner box 38. To insure a tight fit, the inner dimensions of the outer hitch box 31 are sized to fit closely over the outer dimensions of the inner hitch box 38. The inner hitch box 38 comprises four angular walls 39 joined to form a funnel-shaped enclosure that narrows from a front end 40 to a back end 41 for receiving the hitch bar assembly 20. The interior dimensions of the angular walls 39 should provide enough clearance so the bar 21 of the hitch bar assembly 20 can extend to the rear of the hitch box 30 when inserted. In addition, the walls 39 are angled to match the beveled faces of the stops 28 of the hitch bar assembly 20 for proper seating.

The inner hitch box 38 is secured to the outer hitch box 31 by welding the front end 40 to the sidewalls 32 and welding two fillers 42 horizontally between the back end 41 and the sidewalls 32. The inner hitch box 38 is secured inside the outer hitch box 31 so the back end 41 is raised slightly higher than the front end 40 at approximately a five-degree angle. The back end 41 is raised higher to compensate for looseness and weakness in the hitch receiver 2 when spring bars 84 are tensioned. When the spring bars 84 are tensioned, the hitch receiver 2 may angle slightly downward. Therefore, the five-degree angle serves to keep the hitch box assembly 30 nearer to horizontally level.

The outer hitch box 31 also comprises four front tabs 34 for attaching the over-center latch assembly 50 and four back tabs 36 for attaching converging steering links 140, which are described below in the steering section. The front tabs 34 and back tabs 36 define respective through holes 35 and 37. The front tabs 34 are welded at the frontward sides of the outer hitch box 31 at the top and bottom projecting laterally so the through holes 35 align. The back tabs 36 are welded to the bottom rearward sides of the outer hitch box 31 projecting laterally so the through holes 37 align. The back tabs 36 should define a gap between themselves large enough to provide a narrow clearance for inserting the converging steering links 140.

As shown in FIGS. 2 and 3, the over-center latch assembly 50 is similar to the one disclosed in U.S. Pat. No. 4,811,967, which is used to secure the hitch box 30 to the hitch bar assembly 20. The over-center latch assembly 50 includes a left latch 51 and right latch 52 each comprising a pair of connecting links 53, a vertical tube 56, a pivot pin 57, a thrust link 59, a latch pin 61, and a safety pin 62. Each connecting link 53 is a straight bar defining front through holes and back through holes. The pair of connecting links 53 are connected in parallel by hingedly attaching the pivot pin 57 between the front holes and by fixedly attaching the hollow vertical tube 56 between the back holes. The pivot pin 57 defines a transversely directed threaded bore for receiving the thrust link 59 located midway between the two connecting links 53. The thrust link 59 is a threaded rod with a cross head 60 which inserts into the threaded bore of the pivot pin 57 so the surface of the cross head 60 is presented away from the pivot pin 57 for engaging the latch tabs 25 of the hitch bar assembly 20. The thrust link 59 can be screwed either in or out of the threaded bore to allow for any adjustment needed to ensure a tight fit with the latch tabs 25. To rotate the pivot pin 57 and thrust link 59 about a vertical axis, hexagonal heads 58 are attached to each end of the pivot pin 57. The hexagonal heads 58 can be engaged by a conventional end, socket or box wrench to rotate the pivot pin 57 and thrust link 59 to engage and disengage the hitch bar assembly 20. The left latch 51 and right latch 52 are attached to respective front tabs 34 of the hitch box 30 by inserting each latch 51 and 52 in between the top and bottom front tabs 34 so the vertical tubes 56 align with the through holes 35. To secure both latches 51 and 52, latch pins 61 are inserted through the front tabs 34 into the vertical tubes 56 so the latches 51 and 52 can rotate about a vertical axis. For additional security, the latch pins 61 are secured with cotter pins 63.

To secure the hitch bar assembly 20 to the hitch box assembly 30 the bar 21 of the hitch bar assembly 20 inserts into the hitch box assembly 30 until the stops 28 seat against the walls 39 of the inner hitch box 38. The latches 51 and 52 pivot from a slightly outward direction to a slightly inward position, referred to as the over-center position so the connecting links 53 rest against the roll pins 27 of the latch tabs 25. A conventional end, socket or box wrench engages the hexagonal heads 58 of the pivot pins 57 and rotates the pivot pins 57 and thrust links 59 so the cross heads 60 engage the recesses 26 of the latch tabs 25, also referred to as the over-center position. In this position, the hitch box assembly 30 is prevented from moving laterally or vertically with respect to the hitch bar assembly 20. Of course, the over-center latch assembly 50 prevents the hitch box assembly 30 from pulling away from the hitch bar assembly 20. For extra safety, the safety pins 62 are inserted into the through holes 24 of the latch tabs 25. The safety pins 62 prevent the latches 51 and 52 from moving outwardly away from the over-center position. Of course, before anyone attempts to swing either latch 51 or 52 outwardly in order to disconnect the hitch box assembly 30, the safety pins 62 must be removed.

The hitch box assembly 30 also includes an upper king pin 43 and a lower king pin 44 for pivotally connecting to the front support member 70 at a first pivot point 11. The upper king pin 43 inserts into a through hole at the top rear of the outer hitch box 31 and fixedly attaches to the inner hitch box 38 so the upper king pin 43 protrudes upwardly out of the hitch box assembly 30. The lower king pin 44 inserts into a through hole at the bottom rear of the outer hitch box 31 and fixedly attaches to the inner hitch box 38 so the lower king pin 44 protrudes downwardly out of the hitch box assembly 30 and is vertically aligned with the upper king pin 43.

As shown in FIGS. 5A, 5B, 6A, and 6B, the front support member 70 comprises an upper crossbar 71, a lower crossbar 72, side caps 73, spring bar tubes 74, and side support plates 75. Both the upper crossbar 71 and lower crossbar 72 are straight rectangular tubes defining respective vertical through holes 77 and 78 and at the midsection of each tube for pivotally connecting to respective upper king pin 43 and lower king pin 44 at the first pivot point 11. The spring bar tubes 74 are straight square tubes that weld to each end of the lower crossbar 72 so they extend rearwardly and horizontally for receiving the spring bars 84. In addition, the spring bar tubes 74 should extend at an outward angle. When the spring bars 84 are inserted into the spring bar tubes 74, the outward angle allows the spring bars 84 to pivotally attach to the trailer frame 5 via the jack assembly 80 to be described below. The side support plates 75 are rectangular plates defining through holes at a top end for bolting to the side caps 73. The side support plates 75 are welded to the top edges of the spring bar tubes 74 so the plates 75 extend rearwardly and vertically, thus joining the side support plates 75 to the lower crossbar 72. The side caps 73 are flat plates welded to each end of the upper crossbar 71 extending rearwardly and horizontally and define through holes for connecting to the side support plates 75. The side support plates 75 also include strut pins 76 which protrude outwardly and horizontally for connecting to the strut assembly 90 to be described below. The strut pins 76 are located so they are near alignment with the center of converging steering links 140 when the hitch assembly 10 is completely assembled.

To attach the front support member 70 to the hitch box assembly 30, the lower crossbar 72 is pivotally attached to the lower king pin 44 by inserting the lower kingpin 44 into the through hole 78. The upper crossbar 71 is pivotally attached to the upper king pin 43 by inserting the upper king pin into the through hole 77. Using bolts 79, the side support plates 75 are fixedly attached to the side caps 73. When assembled, the front support member 70 provides a stable pivoting connection between the hitch box assembly 30 and the strut assembly 90 at the first pivot point 11.

The strut assembly 90 is an arch-shaped frame that connects the front support member 70 to the ball mount assembly 100 at a second pivot point 12 for transferring pulling and stopping forces. The strut assembly 90 also supports the hanging support assembly 150 to be described below in greater detail. The strut assembly 90 comprises two side tubes 91 and two rear caps 92. The side tubes 91 are arched tubes with front ends that pivotally connect to the strut pins 76 of the front support member 70 so the tubes 91 can pivot vertically but are rigid laterally. Vertical pivoting of the strut assembly 90 through the tubes 91 accommodates uneven roads or drives in which the front of the tow vehicle 1 would be higher or lower than the rear of the tow vehicle 1. The side tubes 91 extend rearwardly and horizontally so both tubes 91 arch inwardly. The rear caps 92 are rectangular plates welded laterally between the tops and bottoms at the rear ends of the side tubes 91 to complete the arch-shaped frame. The rear caps 92 include a ball mount pin 93 vertically connecting the midsections of each cap 92 for pivotally connecting to the ball mount assembly 100. When assembled, the strut assembly 90 extends rearwardly beneath the trailer frame 5 and pivotally attaches to the rear of the ball mount assembly 100 at the second pivot point 12.

The ball mount assembly 100 is a frame with a rectangular front end and a V-shaped rear end that connects the strut assembly 90 to the trailer 4 for transferring pulling and stopping forces. The ball mount assembly 100 comprises side channels 101, vertical supports 102, a ball plate assembly 104, and a tail tube 109. The two side channels 101 are C-shaped channels that extend rearwardly and horizontally parallel with each open-channel side facing inward. The rear ends of the channels 101 angle inward and are welded together forming a V-shape that mirrors the arch-shape of the strut assembly 90. The vertical supports 102 are rectangular plates defining a plurality of through holes 103 for attaching the ball plate assembly 104 at multiple heights. The vertical supports 102 are welded vertically to the top front ends of the channels 101.

Figure 6A:
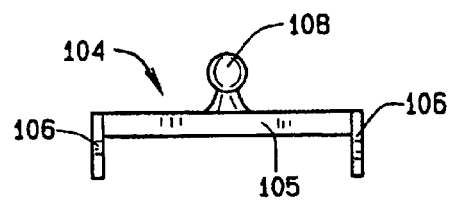
FIG. 6A is a front view of a ball plate assembly.
Figure 6B:
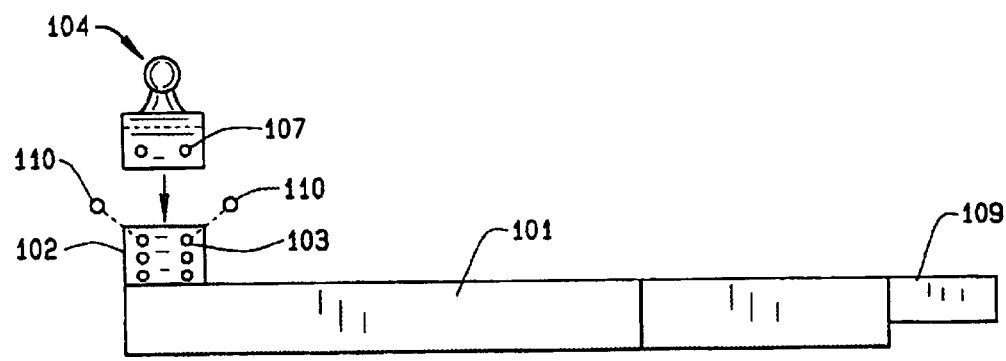
FIG. 6B is a side view of a ball mount assembly.

As shown in FIGS. 6A and 6B, the ball plate assembly 104 is a horizontal crossbar 105 with side supports 106 welded to each end of the crossbar 105 extending downward and a hitch ball 108 mounted to the top center of the crossbar 105. The side supports 106 define through holes 107 for attaching to the vertical supports 102. The tail tube 109 is a straight tube welded to the rear end of the channels 101 so the tail tube 109 extends rearwardly and horizontally for engaging a tail support assembly to be described below in greater detail.

To assemble, the ball plate assembly 104 is bolted to the vertical supports 102 at an appropriate height by aligning holes 107 of the ball plate assembly 104 with the appropriate holes 103 of the vertical support 102 and inserting bolts 110. The entire ball mount assembly 100 is pivotally attached to the ball mount pin 93 of the strut assembly 90 by inserting the ball mount pin 93 through a hole at the intersection of the side channels 101. This pivoting connection allows the ball mount assembly 100 to pivot laterally within the strut assembly 90. In addition, the tail tube 109 couples with the tail support assembly 130 to be described below in greater detail in the steering section. To complete the assembly, the trailer 4 attaches to the ball mount assembly 100 by coupling the hitch ball 108 with the coupler 9. Ordinarily, the typical ball-and-socket trailer hitch accommodates universal movement, but in the present invention, the trailer 4 is prevented from turning relative to the hitch ball 108 by the ball mount assembly 100 and the tail support assembly 130. Instead, this movement is accommodated by the converging links 140 and the slide assembly 120 described below in the steering section. However, the trailer 4 is free to rock from side-to-side on the hitch ball 108 in reference to the tow vehicle 1 and the rear of the ball mount assembly 100 where the tail tube 109 slides into the tail support assembly 130.

In operation, the pulling and stopping forces are transferred from the tow vehicle 1 through the hitch receiver 2 to the hitch bar assembly 20, from the hitch bar assembly 20 to the hitch box assembly 30, from the hitch box assembly 30 to the front support member 70, from the front support member 70 to the strut assembly 90, from the strut assembly 90 to the ball mount assembly 100, and finally, from the ball mount assembly 100 to the trailer 4. As mentioned above, none of the pulling and stopping forces are transferred through the converging links 140.

Steering

Figure 7A:
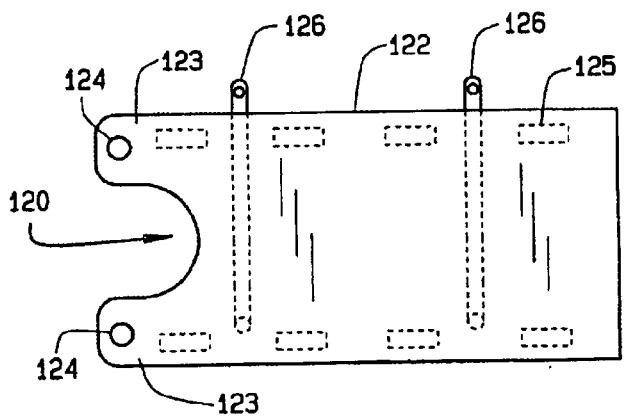
FIG. 7A is a partial top view of a sliding assembly.
Figure 7B:
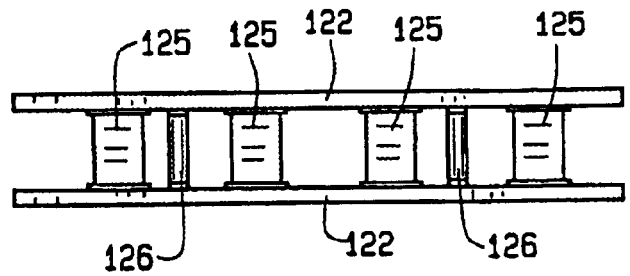
FIG. 7B is a partial side view of the sliding assembly.
Figure 7C:
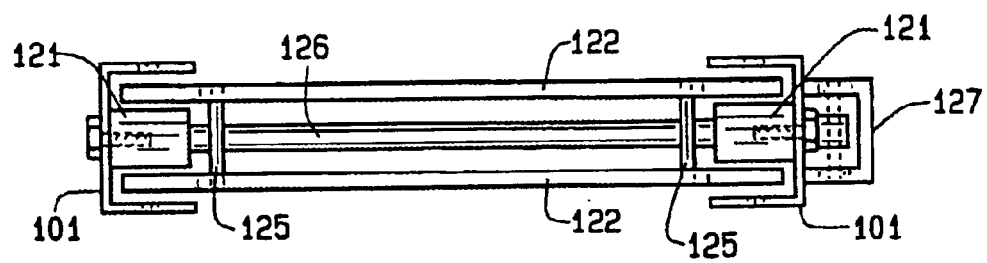
FIG. 7C is a partial end view of the sliding assembly.
Figure 11:
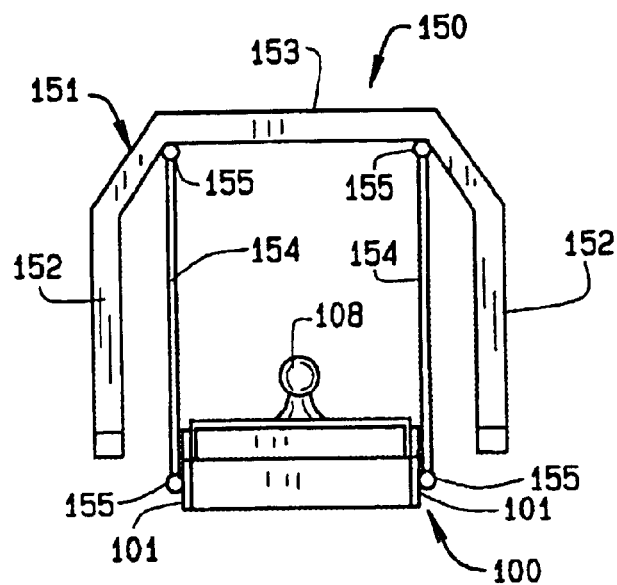
FIG. 11 is a partial end view of a hanging support assembly.
Figure 8A:
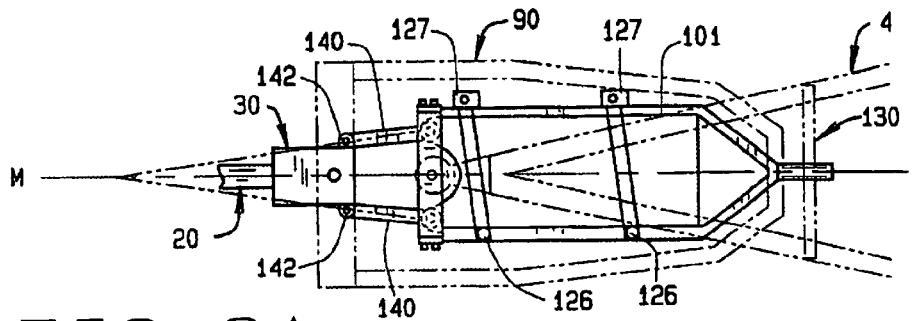
FIG. 8A is a partial top view of the hitch assembly of the present invention during straight travel.
Figure 8B:
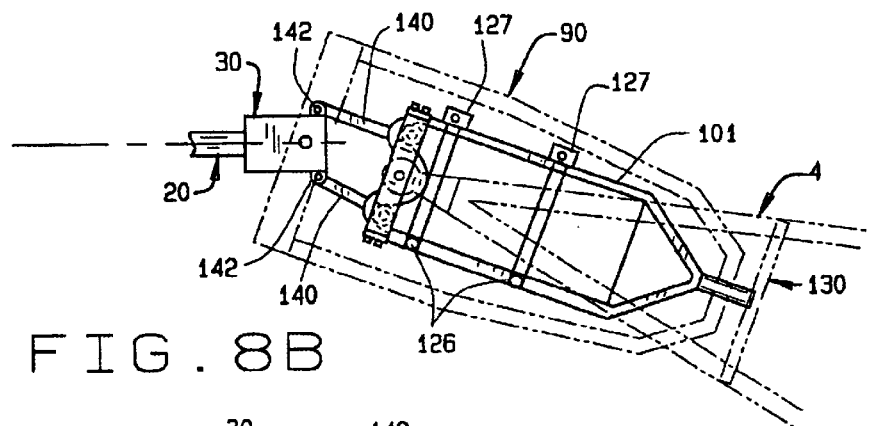
FIG. 8B is a partial top view of the hitch assembly of the present invention during a slight turn.
Figure 8C:
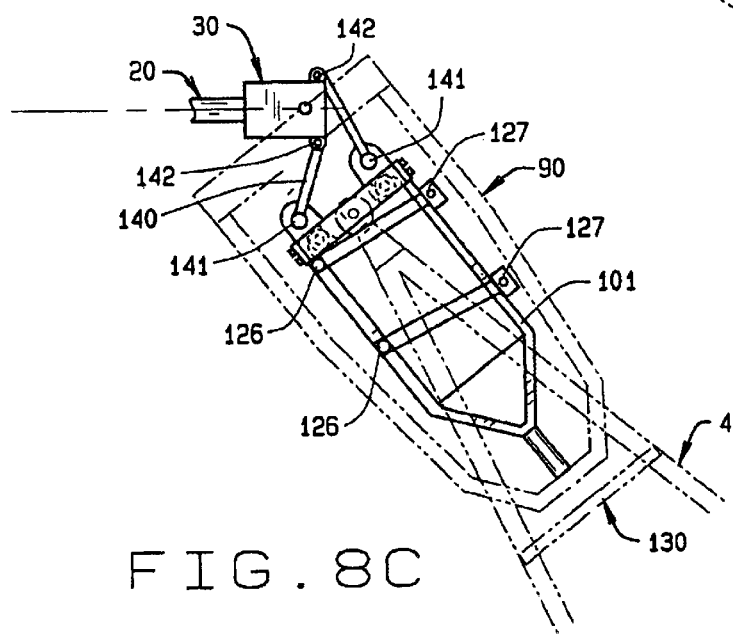
FIG. 8C is a partial top view of the hitch assembly of the present invention during a sharp turn.
Figure 9:
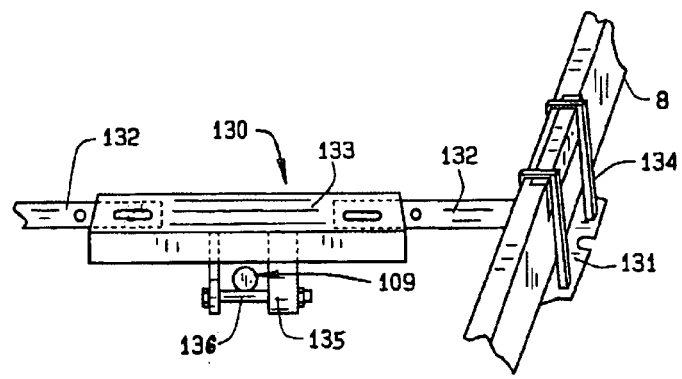
FIG. 9 is a partial perspective view of a tube support assembly.
Figure 10:
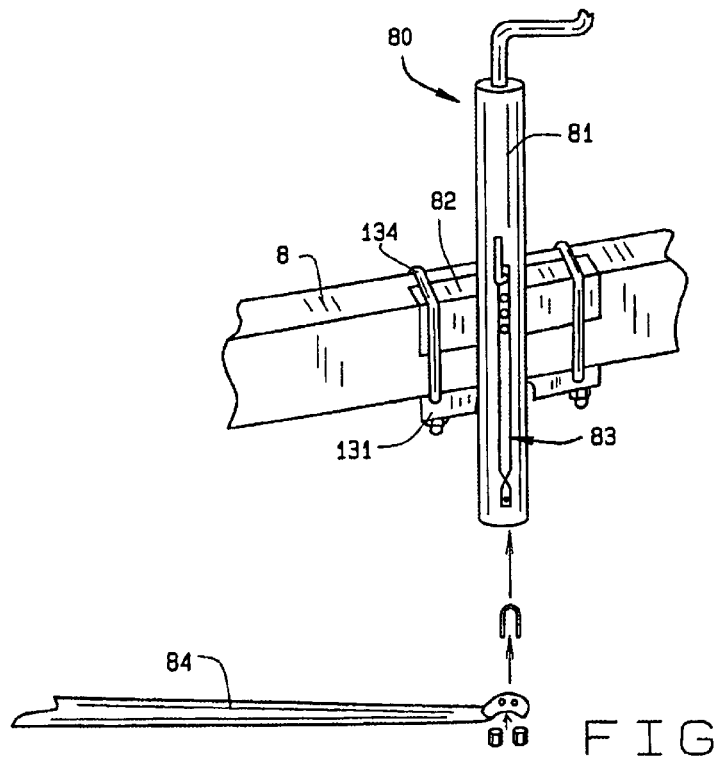
FIG. 10 is a partial perspective view of a jack assembly.

As shown in FIGS. 7–9, the steering function of the hitch assembly 10 of the present invention is accomplished through a slide assembly 120, a tail support assembly 130, and converging links 140. The converging links 140 are similar to the ones disclosed in U.S. Pat. No. 4,722,542 and U.S. Pat. No. 5,660,409, hereby incorporated by reference. The slide assembly 120, tail support assembly 130, and converging links 140 effectively move the pivot axis for the hitch assembly 10 to near the rear axle of the tow vehicle 1. This projection of the pivot axis provides the hitch assembly 10 with good lateral stability with little or no tendency to sway or fishtail when buffeted by cross winds or when otherwise subjected to lateral forces. However, in the present design the converging links 140 do not carry any tongue weight and they do not transfer pulling or stopping forces, as described above.

The slide assembly 120 comprises guides 121, slide plates 122, crosslinks 126, and crosslink brackets 127. The guides 121 are plastic rectangular bars attached along the inside of the side channels 101 of the ball mount assembly 100 to act as bearing surfaces for supporting and guiding the slide plates 122. The slide plates 122 are rectangular plates with a cutout in a front end defining two link tabs 123 and corresponding holes 124 for attaching the converging links 140. The two slide plates 122 are welded together one on top of the other with evenly spaced spacers 125 so there is a gap between the plates 122 for receiving the guides 121. When assembled, the slide plates 122 reside within the side channels 101 of the ball mount assembly 100 so the slide plates 122 slide forward and backward along the guides 121. Located between the slide plates 122 is a pair of horizontal crosslinks 126 which are parallel to one another. One end of the crosslinks 126 is pivotally attached to one side of the slide plates 122 and runs crossways between the slide plates 122. The other end of the crosslinks 126 protrudes through corresponding openings cut out of one of the side channels 101. The protruding crosslink 126 ends are pivotally attached to a pair of crosslink brackets 127 which are welded to the outside face of the side channels 101.

As described above, the rear of the ball mount assembly 100 has an extended tail tube 109 that engages the tail support assembly 130. The tail support assembly comprises a U-bolt plate 131, a channel 133, and a tail bracket 135. The U-bolt plate 131 is a rectangular plate with an angled channel tab 132 extending laterally for supporting the channel 133. Each U-bolt plate 131 is clamped to the bottom of each trailer side member 8 using U-bolts 134 so the channel tabs 132 face inwardly and align parallel with each other. The channel 133 attaches between the channel tabs 132 so the channel 133 can be adjusted laterally for centering the tube support assembly 130 relative to the trailer 4. The tail bracket 135 attaches to the underside of the channel 133 and extends downward so a roller 136 is parallel with the channel 133.

When assembled, the tail tube 109 rests snuggly inside the tail bracket 135. Although the roller 136 allows the tail tube 109 to move forward and backward along the longitudinal axis of the ball mount assembly 100, the tail bracket 135 restricts any other lateral movement of the tail tube 109. The ability to move forward and backward accommodates any such motion created by the use of surge brakes. Since the trailer 4 is rigidly attached to the tail support assembly 130, the longitudinal axis of the trailer 4 remains parallel with the longitudinal axis of the tail support assembly 130 at all times.

The converging links 140 are straight links of equal length having spherical bearings 141 on each end for pivotally connecting the hitch box assembly 30 to the slide assembly 120. The front ends of the converging links 140 are pivotally attached to the back tabs 36 of the hitch box assembly 30 with link pins 142. The rear ends of the converging links 140 pivotally attach to the link tabs 123 of the slide assembly 120 with link pins 142. The spherical bearings 141 allow the converging links 140 to pivot in any direction to prevent any misalignment during turns, inclines, or declines.

When assembled, the converging links 140 are equidistant from the centerline M and converge forwardly. The convergence is such that the links 140, if extended forwardly, will intersect along a centerline M perhaps ahead of the rear of the tow vehicle 1, perhaps ahead of the rear wheels 6. When the trailer 4 is directly behind the tow vehicle 1, the links 140 are symmetrically positioned. When the trailer 4 shifts to one side or the other during turns, the convergence intersection transfers to points which are closer to the hitch box assembly 30 and offset from the centerline M. Together, the converging links 140 and slide assembly 120 effectively move the pivot axis for the hitch assembly 10 to near the rear axle of the tow vehicle 1.

The relative relationship of the elements of the hitch assembly 10 when the tow vehicle 1 and trailer 4 are negotiating turns are shown in FIGS. 8A, 8B, and 8C. As the tow vehicle 1 turns relative to the trailer 4, the hitch bar assembly 20 and hitch box assembly 30 necessarily move in the direction of hitch receiver 2 on the tow vehicle 1. The front support member 70 and strut assembly 90 pivot at the first pivot point 11. Simultaneously, the converging links 140 pivot to allow turning while maintaining the effective hitch pivot axis near the rear of the tow vehicle 1. As the individual links 140 pivot, the relative radius of the links 140 shorten drawing the slide assembly 120 forward towards the hitch box assembly 30 and the ball mount assembly 100 pivots at the second pivot point 12. As the tow vehicle 1 turns sharper, the ball mount assembly 100 will pivot at the second pivot point 12 until it rests nearly against the strut assembly 90. As mentioned above, the trailer 4 remains parallel with the longitudinal axis of the ball mount assembly 100 because the trailer 4 is rigidly attached to the ball mount assembly 100 and the tail support assembly 130. Since ball mount assembly 100 with the hitch ball 108 and trailer 4 attached thereto, are held in place at the second pivot point 12 by strut assembly 90, the trailer 4 remains a predetermined distance away from the tow vehicle 1 (e.g. the length of the strut assembly minus the length of the ball mount assembly plus a small change in the radius of ball mount assembly as it moves side-to-side). Therefore, braking of the tow vehicle even without the use of good trailer brakes doesn't allow pressure to be exerted on the converging links.

In this way the converging links 140 steer the trailer 4 and the sliding movement of the slide assembly 120 accommodates the change in radial movement of the converging links 140 during turns. However, neither the slide assembly 120 nor the converging links 140 carry any of the tongue weight as in previous designs. Instead, the tongue weight is carried on a hanging support assembly 150 to be described below in the weight carrying section. As a result, the present invention allows for more tongue weight without adding to the cost and weight by increasing the size of the converging links and all associated components as in previous designs. In addition, adjustable blocks are not needed to keep the side movement of the ball mount assembly 100 to near zero clearance. Instead, the present invention uses two parallel crosslinks 126 which eliminate the need for fine-tune or maintenance as in previous designs.

Weight Carrying

Generally, the present invention can handle greater gross trailer loads than previous designs. In the present invention, this is accomplished by not carrying any tongue weight with the converging links 140, as mentioned above. Instead, the hanging support assembly 150 carries the tongue weight, which keeps the converging links 140 approximately level with the hitch assembly 10 at all times. In addition, spring bars 84 and the jack assembly 80 distribute the tongue weight among all the tow vehicle wheels 3 and all the trailer wheels 6. As a result, the present invention relates to Class III or heavier rated hitch systems.

The hanging support assembly 150 comprises a support frame 151 and a pair of vertical links 154. The support frame 151 is an arch-shaped frame including legs 152 that rigidly attach vertically to the front end of the strut assembly 90 and a crossbar 153 connecting the legs 152. The support frame 151 should be attached directly over the side supports 106 of the ball plate assembly 104 with the crossbar 153 parallel with the front support member 70. The vertical links 154 are straight links with spherical bearings 155 attached at each end for connecting the support frame 151 to the side channels 101 of the ball mount assembly 100. Top ends of the vertical links 154 pivotally connect to the crossbar 153 so the vertical links 154 hang parallel to each other. Bottom ends of the vertical links 154 pivotally connect to respective side channels 101. The spherical bearings 155 allow the ball mount assembly 100 to pivot during turning as described above. When assembled, the tongue weight placed on the ball mount assembly 100 by the trailer 4 is transferred to the hanging support assembly 150 via the vertical links 154. The hanging support assembly 150 transfers the weight through the strut assembly 90 and front support member 70 to the hitch box assembly 30 and hitch bar assembly 20, which are supported by the hitch receiver 2. As will be described below, the springs bars 84 and jack assembly 80 distribute the weight among all the tow vehicle wheels 3 and all the trailer wheels 6. As a result, the tongue weight is transferred to the tow vehicle 1 and the trailer 4 without placing any tongue weight on the converging links 140.

Figure 12:
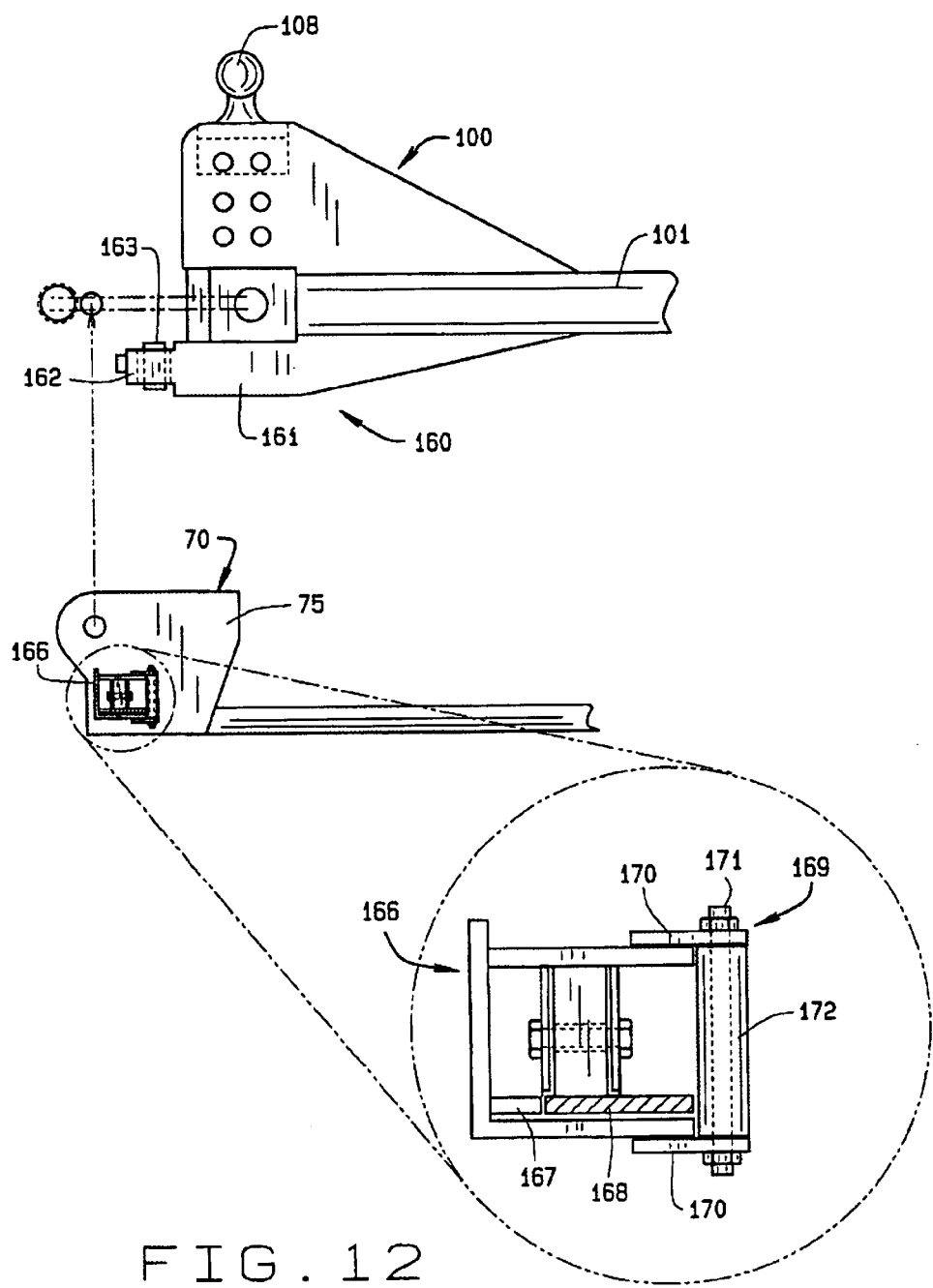
FIG. 12 is a side view of an alternate embodiment of the invention using a roller assembly.

Those skilled in the art will recognize that alternative embodiments may be used in place of the hanging support assembly 150 to carry the tongue weight. For example, FIG. 12 illustrates a roller assembly 160 for supporting the tongue weight on the hitch assembly 10. The roller assembly 160 comprises a pair of roller supports 161, a pair of rollers 163, a C-channel 166, and a channel support 169. Each roller support 161 is a flat plate that welds to the bottom of a respective side channel 101 of the ball mount assembly 100 so that roller tabs 162 extend forwardly. The rollers 163 pivotally attach to each roller tab 162 so they can engage the C-channel 166. The C-channel 166 is welded between the side tubes 91 of the strut assembly 90 with the opening of the C-channel 166 facing the rollers 163 for engagement. The C-channel 166 includes a spacer 167 and a wear plate 168 along an inner bottom surface. When assembled the rollers 163 fit inside the C-channel 166 so the rollers 163 can roll back and forth along either the wear plate 168 or the top inner surface of the C-channel 166. The channel support 169 attaches to the midsection of the C-channel 166 to provide additional support to the C-channel 166. The channel support 169 includes two tabs 170 that respectively attach to the top and bottom of the C-channel 166. A bolt 171 and spacer 172 connect the two tabs. During operation, tongue weight is transferred from the hitch ball 108 and ball mount assembly 100 through the roller assembly 160 to the front support member 70. As described above, the tongue weight then transfers from the front support member 70 to the hitch box assembly 30 and hitch bar assembly 20, which are supported by the hitch receiver 2. Finally, the springs bars 84 and jack assembly 80 distribute the weight among all the tow vehicle wheels 3 and all the trailer wheels 6. As a result, the tongue weight is transferred to the tow vehicle 1 and the trailer 4 without placing any tongue weight on the converging links 140.

As mentioned above, the spring bars 84 are inserted into the spring bar tubes 74 located on the front support member 70 extending rearwardly and horizontally at an outward angle so they can attach to the trailer frame 5 via the jack assembly 80. The outward angle positions the rear ends of the spring bars 84 into near alignment with the side members 8 of the trailer's A-frame. The spring bars 84 also slope downward toward the rear to allow for tensioning.

The jack assembly 80 comprises a pair of jacks 81, jack brackets 82, spring bar links 83, and the spring bars 84. The jack brackets 82 are L-shaped brackets secured to the top of the side members 8 of the trailer 4 by the same U-bolts 134 used to secure the U-bolt plates 131. However, the jack brackets can be secured by any other conventional means, such as welding or independent U-bolts. The jacks 81 are vertically welded to the jack brackets 82 so each jack 81 resides in a recess of the U-bolt plate 131. The spring bars 84 are attached to the jacks 81 with the spring bar links 83. The upper end of each spring bar link 83 is pivotally attached to each jack 81 and the lower end of the each link 83 is pivotally attached to each spring bar 84. Consequently, the jacks 81 can tension the spring bars 84 while still allowing pivotal movement during turns. The jacks 81 should be cranked until appropriate tension is applied to the spring bars 84. Spring bars have long been used in conjunction with trailer hitches to achieve better weight distribution among all the tow vehicle wheels and all the trailer wheels, and the principle will therefore not be described in more detail here.

Figure 13:
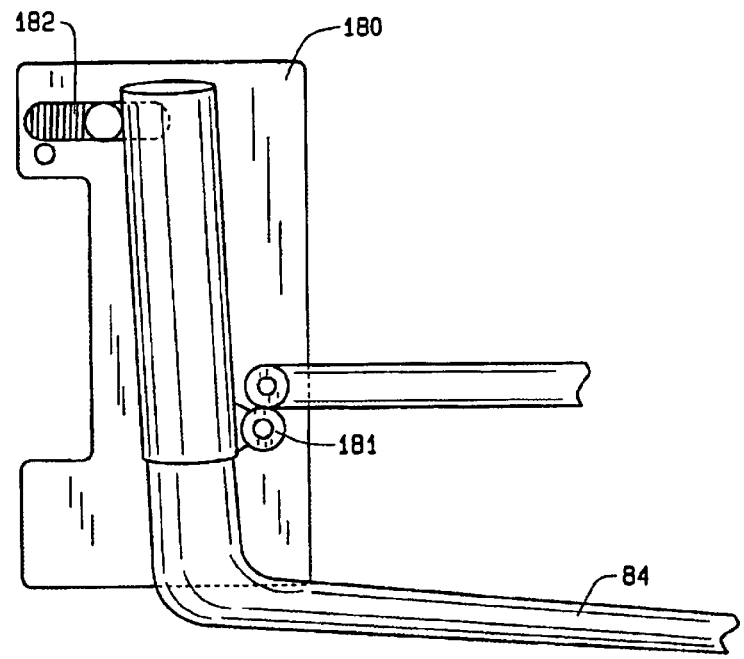
FIG. 13 is a top view of an alternate embodiment of a front support member and spring bar.
Figure 14:
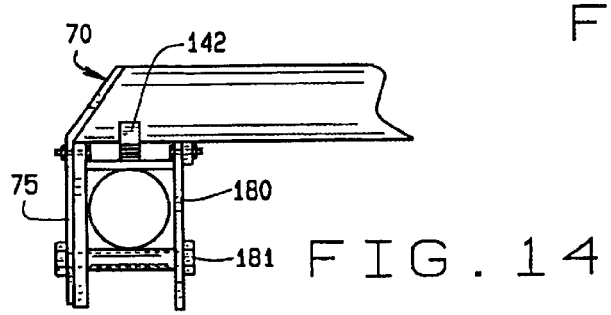
FIG. 14 is a side view of an alternate embodiment of the front support member and spring bar.

Changes can be made in the above constructions without departing from the scope of the invention, it is intended that all matter contained in the above description or shown in the accompanying drawings shall be interpreted as illustrative and not in a limiting sense. For example, the spring bars 84 and front support member 70 can be modified to accommodate different shapes and sizes of trailer frames. In one alternate embodiment shown in FIGS. 13 and 14, the front support member 70 includes inner plates 180 parallel to the side support plates 75. The plates 180 and 75 should be spaced appropriately for receiving the spring bars 84. In this alternate embodiment, the spring bars 84 are round L-shaped bars. The spring bars 84 are pivotally attached to bushings 181 located between the plates 180 and 75. Using an adjustable T and washers 182 attached to the plates 180 and 75, the spring bars 84 can pivot to accommodate different shape and sizes of trailer frames. It should be noted that in this alternate embodiment, the spring bar tubes 74 of the front support member 70 described above are not included.

Figure 15:
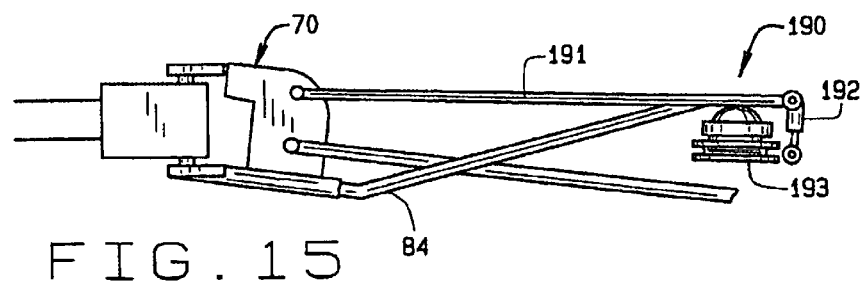
FIG. 15 is a side view of an alternate embodiment of the invention using an air bellows.

In another alternate embodiment shown in FIG. 15, the jack assembly 80 is replaced with an air bellows assembly 190 for distributing the tongue weight among all the tow vehicle wheels 3 and all the trailer wheels 6. In this embodiment, the spring bars 84 attach to a bellows bracket 191. The bellows bracket 191 pivotally attaches between the front support member 70 and a shock absorber 192. The shock absorber pivotally attaches to the trailer frame 6. The bellows bracket 191 rests on an adjustable air bellows 193. In operation, the air bellows 193 adjusts similar to the jacks 81 of the first embodiment to equalize the tongue weight.

What is claimed is:

1. A hitch assembly comprising:
   a hitch bar assembly coupled with a hitch receiver of a tow vehicle for transferring pulling and stopping forces to and from the tow vehicle;
   a hitch box assembly coupled with the hitch bar assembly for transferring pulling and stopping forces to and from the hitch bar assembly, the hitch box assembly having a first pivot point;
   an overcenter latch assembly securing the hitch box assembly to the hitch bar assembly;
   a front support member pivotally connected to the hitch box assembly at the first pivot point for transferring pulling and stopping forces to and from the hitch box assembly and for pivoting during turns;
   a strut assembly pivotally connected to the front support member for transferring pulling and stopping forces to and from the front support member and the strut assembly includes a second pivot point;
   a ball mount assembly pivotally connected to the strut assembly at the second pivot point for transferring pulling and stopping forces to and from the strut assembly, wherein the ball mount assembly laterally pivots about the second pivot point within the strut assembly during turns, the ball mount assembly including a tail tube extending rearwardly;
   a ball plate assembly attached to the ball mount assembly for transferring pulling and stopping forces to and from the ball mount assembly which includes a hitch ball for removable attachment of the trailer for transferring pulling and stopping forces to and from the trailer;
   a tail support assembly attached to a trailer frame and coupled with the tail tube whereby the tail support assembly restricts lateral movement of the tail tube and ball mount assembly so the trailer remains relative to the ball mount assembly at all times;
   a slide assembly residing within the ball mount assembly such that forces inherent in towing the trailer are not transferred through the slide assembly whereby the slide assembly slides forwards and backwards to accommodate the change in radial movement of converging links during turns;
   the converging links pivotally connected between the hitch box assembly at the first pivot point and the slide assembly whereby the angular position between the first pivot point and slide assembly can be varied, the converging links effectively moving the pivot point between the tow vehicle and trailer forward of the hitch assembly, wherein forces inherent in towing the trailer are not transferred through the converging links;
   a hanging support assembly attached to the strut assembly including at least one vertical link pivotally attached to the ball mount assembly for transferring tongue weight from the ball mount assembly through the strut assembly and front support member to the hitch box assembly and hitch bar assembly so tongue weight is not exerted on the converging links or the slide assembly;
   a jack assembly attached between the trailer frame and the front support member for distributing tongue weight among tow vehicle wheels and trailer wheels.

2. The hitch assembly of claim 1, wherein the hitch bar assembly comprises:
   a square bar for inserting into the hitch receiver;
   overcenter latch tabs attached to the midsection of each side of the bar defining recesses for coupling with the overcenter latch assembly; and
   at least one stop attached to the rear of the tabs on the bar for coupling with the hitch box assembly.

3. The hitch assembly of claim 1, wherein the hitch box assembly comprises:
   an outer hitch box defining an opening, front tabs for attaching to the over-center latch assembly, and back tabs for pivotally attaching the converging links;
   an inner hitch box attached within the opening of the outer hitch box including angular walls for seating with the hitch bar assembly; and
   at least one king pin for pivotally connecting to the front support member at the first pivot point.

4. The hitch assembly of claim 1, wherein the overcenter latch assembly comprises a pair of latches pivotally attached to the hitch box assembly, each latch including a pair of connecting links attached in parallel with vertical tubes attaching to an end of connecting links, pivot pins pivotally attached to an end of the connecting links opposite the vertical tubes defining transversely threaded bores wherein the pivot pins can rotate about a vertical axis, thrust links inserted into the threaded bores of the pivot pins for engaging the hitch bar assembly wherein the thrust links can be adjusted to insure a tight fit.

5. The hitch assembly of claim 1, wherein the front support member comprises:
   an upper crossbar for pivotally connecting to the hitch box assembly at the first pivot point;
   a lower crossbar for pivotally connecting to the hitch box assembly at the first pivot point;
   side caps connecting the ends of the upper crossbar and the lower crossbar;
   spring bar tubes attached to each bottom end of the lower crossbar extending at an outward angle for coupling with the jack assembly; and
   side support plates connecting the spring bar tube to the side caps so the upper crossbar and the lower crossbar are parallel.

6. The hitch assembly of claim 1, wherein the strut assembly comprises:
   side tubes pivotally attached to the front support member so the side tubes may pivot vertically but are rigid laterally to accommodate uneven roads during driving;
   rear caps attached between rear ends of the side tubes completing an arch-shaped frame; and
   a ball mount pin attached at the second pivot point for pivotally attaching the ball mount assembly.

7. The hitch assembly of claim 1, wherein the ball mount assembly comprises:
   a pair of c-shaped side channels extending rearwardly and horizontally parallel with each other so each opening faces inward for receiving the slide assembly and a rear portion of the side channels angling inward and connecting to form a V-shape for attaching to the strut assembly at the second pivot point; and
   vertical supports attached to front ends of the side channels for attaching the ball plate assembly at multiple heights.

8. The hitch assembly of claim 1, wherein the ball plate assembly comprises:
   a crossbar;
   side supports attached to each end of the crossbar, wherein the hitch ball attaches to the midsection of the crossbar for removable attachment of the trailer for transferring pulling and stopping forces to and from the trailer.

9. The hitch assembly of claim 1, wherein the tail support assembly comprises:
- u-bolt plates attached to the trailer frame including an angled channel tab extending laterally inward;
- a channel attached between the u-bolt plates so the channel can be adjusted laterally;
- a tail bracket attached to an underside of the channel for restricting lateral movement of the tail tube and ball mount assembly so the trailer remains relative to the ball mount assembly at all times; and
- a roller attached to the tail bracket for supporting the tail tube and allowing movement of the tail tube along a longitudinal axis of the trailer to accommodate movement resulting from the use of surge brakes.

10. The hitch assembly of claim 1, wherein the slide assembly comprises:
- guides attaching to the ball mount assembly to act as bearing surfaces;
- a pair of slide plates attached in parallel with spacers, the slide plates including front ends for pivotally attaching to the converging links whereby the slide plates slide back and forth along the guides;
- crosslink brackets attached to the ball mount assembly; and
- crosslinks pivotally attached between the slide plates and the crosslink brackets to limit the back and forth motion of the slide plates.

11. The hitch assembly of claim 1, wherein the hanging support assembly comprises:
- a support frame attached to the strut assembly including a pair of legs connected by a crossbar;
- at least one vertical link pivotally connected between the crossbar and the ball mount assembly.

12. The hitch assembly of claim 1, wherein the jack assembly comprises:
- jack brackets attached to the trailer frame;
- jacks attached to the jack brackets;
- spring bars attached to the front support member and pivotally attached to the jacks whereby the jacks can be adjusted to appropriately tension the spring bars for proper weight distribution.

13. A hitch assembly comprising:
- a hitch bar assembly coupled with a hitch receiver of a tow vehicle for transferring pulling and stopping forces to and from the tow vehicle, the hitch bar including a square bar for inserting into the hitch receiver, overcenter latch tabs attached to the midsection of each side of the bar defining recesses, and at least one stop attached to the rear of the tabs on the bar;
- a hitch box assembly coupled with the hitch bar assembly for transferring pulling and stopping forces to and from the hitch bar assembly, the hitch box assembly having a first pivot point, the hitch box assembly including an outer hitch box defining an opening, front tabs, and back tabs, an inner hitch box attached within the opening of the outer hitch box including angular walls for seating with the stop of the hitch bar assembly, and at least one king pin attached at the first pivot point;
- an overcenter latch assembly securing the hitch box assembly to the hitch bar assembly, the overcenter latch assembly including a pair of latches pivotally attached to the front tabs of the hitch box assembly, each latch including a pair of connecting links attached in parallel with vertical tubes attaching to an end of connecting links, pivot pins pivotally attached to an end of the connecting links opposite the vertical tubes defining transversely threaded bores wherein the pivot pins can rotate about a vertical axis, and thrust links inserted into the threaded bores of the pivot pins for engaging the recesses of the latch tabs of the hitch bar assembly wherein the thrust links can be adjusted to insure a tight fit;
- a front support member pivotally connected to the hitch box assembly at the first pivot point for transferring pulling and stopping forces to and from the hitch box assembly and for pivoting during turns, the front support member including an upper crossbar for pivotally connecting to the king pin of the hitch box assembly at the first pivot point, a lower crossbar for pivotally connecting to the king pin of the hitch box assembly at the first pivot point, side caps connecting the ends of the upper crossbar and the lower crossbar, spring bar tubes attached to each bottom end of the lower crossbar extending at an outward angle; and side support plates connecting the spring bar tube to the side caps so the upper crossbar and the lower crossbar are parallel;
- a strut assembly pivotally connected to the front support member for transferring pulling and stopping forces to and from the front support member and the strut assembly includes a second pivot point, the strut assembly including side tubes pivotally attached to the front support member so the side tubes may pivot vertically but are rigid laterally to accommodate uneven roads during driving, rear caps attached between rear ends of the side tubes completing an arch-shaped frame, and ball mount pin attached at the second pivot point;
- a ball mount assembly pivotally connected to the strut assembly at the second pivot point for transferring pulling and stopping forces to and from the strut assembly, wherein the ball mount assembly laterally pivots about the second pivot point within the strut assembly during turns, the ball mount assembly including a tail tube extending rearwardly, the ball mount including a pair of c-shaped side channels extending rearwardly and horizontally parallel with each other so each opening faces inward for receiving the slide assembly and a rear portion of the side channels angling inward and connecting to form a V-shape for attaching to the ball mount pin of the strut assembly at the second pivot point, and vertical supports attached to front ends of the side channels;
- a ball plate assembly attached to the ball mount assembly for transferring pulling and stopping forces to and from the ball mount assembly, wherein the ball plate may attach at multiple height, the ball plate assembly including a crossbar, side supports attached to each end of the crossbar, and a hitch ball attaches to the midsection of the crossbar for removable attachment of the trailer for transferring pulling and stopping forces to and from the trailer;
- a tail support assembly attached to a trailer frame and coupled with the tail tube whereby the tail support assembly restricts lateral movement of the tail tube and ball mount assembly so the trailer remains relative to the ball mount assembly at all times, the tail support assembly including u-bolt plates attached to the trailer frame including an angled channel tab extending laterally inward, a channel attached between the u-bolt plates so the channel can be adjusted laterally, tail bracket attached to an underside of the channel for restricting lateral movement of the tail tube and ball mount assembly, and a roller attached to the tail bracket for supporting the tail tube and allowing movement of the tail tube along a longitudinal axis of the trailer to accommodate movement resulting from the use of surge brakes;

a slide assembly residing within the ball mount assembly such that forces inherent in towing the trailer are not transferred through the slide assembly whereby the slide assembly slides forwards and backwards to accommodate the change in radial movement of converging links during turns, the slide assembly including guides attaching to the side channels of the ball mount assembly to act as bearing surfaces, a pair of slide plates attached in parallel with spacers, the slide plates including front ends for pivotally attaching to the converging links whereby the slide plates slide back and forth along the guides, crosslink brackets attached to the side channels of the ball mount assembly, and crosslinks pivotally attached between the slide plates and the crosslink brackets to limit the back and forth motion of the slide plates;

the converging links pivotally connected between the hitch box assembly at the first pivot point and the slide assembly whereby the angular position between the first pivot point and slide assembly can be varied, the converging links effectively moving the pivot point between the tow vehicle and trailer forward of the hitch assembly, wherein forces inherent in towing the trailer are not transferred through the converging links;

a hanging support assembly attached to the strut assembly including at least one vertical link pivotally attached to the ball mount assembly for transferring tongue weight from the ball mount assembly through the strut assembly and front support member to the hitch box assembly and hitch bar assembly so tongue weight is not exerted on the converging links or the slide assembly, the hanging support assembly including a support frame attached to the side tubes of the strut assembly including a pair of legs connected by a crossbar, and at least one vertical link pivotally connected between the crossbar and the side channels of the ball mount assembly; and a jack assembly attached between the trailer frame and the front support member for distributing tongue weight among tow vehicle wheels and trailer wheels, the jack assembly including jack brackets attached to side members of the trailer frame, jacks attached to the jack brackets, and spring bars attached to the spring bar tubes of the front support member and pivotally attached to the jacks whereby the jacks can be adjusted to appropriately tension the spring bars for proper weight distribution.

14. A hitch assembly comprising:

a hitch bar assembly coupled with a hitch receiver of a tow vehicle for transferring pulling and stopping forces to and from the tow vehicle;

a hitch box assembly coupled with the hitch bar assembly for transferring pulling and stopping forces to and from the hitch bar assembly, the hitch box assembly having a first pivot point;

an overcenter latch assembly securing the hitch box assembly to the hitch bar assembly;

a front support member pivotally connected to the hitch box assembly at the first pivot point for transferring pulling and stopping forces to and from the hitch box assembly and for pivoting during turns;

a strut assembly pivotally connected to the front support member for transferring pulling and stopping forces to and from the front support member and the strut assembly includes a second pivot point;

a ball mount assembly pivotally connected to the strut assembly at the second pivot point for transferring pulling and stopping forces to and from the strut assembly, wherein the ball mount assembly laterally pivots about the second pivot point within the strut assembly during turns, the ball mount assembly including a tail tube extending rearwardly;

a ball plate assembly attached to the ball mount assembly for transferring pulling and stopping forces to and from the ball mount assembly which includes a hitch ball for removable attachment of the trailer for transferring pulling and stopping forces to and from the trailer;

a tail support assembly attached to a trailer frame and coupled with the tail tube whereby the tail support assembly restricts lateral movement of the tail tube and ball mount assembly so the trailer remains relative to the ball mount assembly at all times;

converging links pivotally connected between the hitch box assembly at the first pivot point and the slide assembly whereby the angular position between the first pivot point and slide assembly can be varied, the converging links effectively moving the pivot point between the tow vehicle and trailer forward of the hitch assembly, wherein forces inherent in towing the trailer are not transferred through the converging links;

a roller assembly attached to a front of the ball mount assembly for transferring tongue weight from the ball mount assembly through the roller assembly and front support member to the hitch box assembly and hitch bar assembly so tongue weight is not exerted on the converging links or the slide assembly, the roller assembly including a C-channel attached to a front of the strut assembly, rollers attached to the ball mount assembly so they engage the C-channel whereby the rollers roll back and forth within the C-channel; and a jack assembly attached between the trailer frame and the front support member for distributing tongue weight among tow vehicle wheels and trailer wheels.

15. A hitch assembly comprising:

a hitch bar assembly coupled with a hitch receiver of a tow vehicle for transferring pulling and stopping forces to and from the tow vehicle;

a hitch box assembly coupled with the hitch bar assembly for transferring pulling and stopping forces to and from the hitch bar assembly, the hitch box assembly having a first pivot point;

an overcenter latch assembly securing the hitch box assembly to the hitch bar assembly;

a front support member pivotally connected to the hitch box assembly at the first pivot point for transferring pulling and stopping forces to and from the hitch box assembly and for pivoting during turns;

a strut assembly pivotally connected to the front support member for transferring pulling and stopping forces to and from the front support member and the strut assembly includes a second pivot point;

a ball mount assembly pivotally connected to the strut assembly at the second pivot point for transferring pulling and stopping forces to and from the strut assembly, wherein the ball mount assembly laterally pivots about the second pivot point within the strut assembly during turns, the ball mount assembly including a tail tube extending rearwardly;

a ball plate assembly attached to the ball mount assembly for transferring pulling and stopping forces to and from the ball mount assembly which includes a hitch ball for removable attachment of the trailer for transferring pulling and stopping forces to and from the trailer;

a tail support assembly attached to a trailer frame and coupled with the tail tube whereby the tail support assembly restricts lateral movement of the tail tube and ball mount assembly so the trailer remains relative to the ball mount assembly at all times;

a slide assembly residing within the ball mount assembly such that forces inherent in towing the trailer are not transferred through the slide assembly whereby the slide assembly slides forwards and backwards to accommodate the change in radial movement of converging links during turns;

the converging links pivotally connected between the hitch box assembly at the first pivot point and the slide assembly whereby the angular position between the first pivot point and slide assembly can be varied, the converging links effectively moving the pivot point between the tow vehicle and trailer forward of the hitch assembly, wherein forces inherent in towing the trailer are not transferred through the converging links;

a hanging support assembly attached to the strut assembly including at least one vertical link pivotally attached to the ball mount assembly for transferring tongue weight from the ball mount assembly through the strut assembly and front support member to the hitch box assembly and hitch bar assembly so tongue weight is not exerted on the converging links or the slide assembly;

an air bellows assembly attached between the trailer frame and the front support member for distributing tongue weight among tow vehicle wheels and trailer wheels, the air bellows assembly including a bellows bracket pivotally attached to the front support member, a shock absorber pivotally attached to the trailer frame, and a spring bar attached between the bellows bracket and shock absorber so that the spring bars rest on adjustable air bellows.

* * * * *